Patented Aug. 7, 1928.

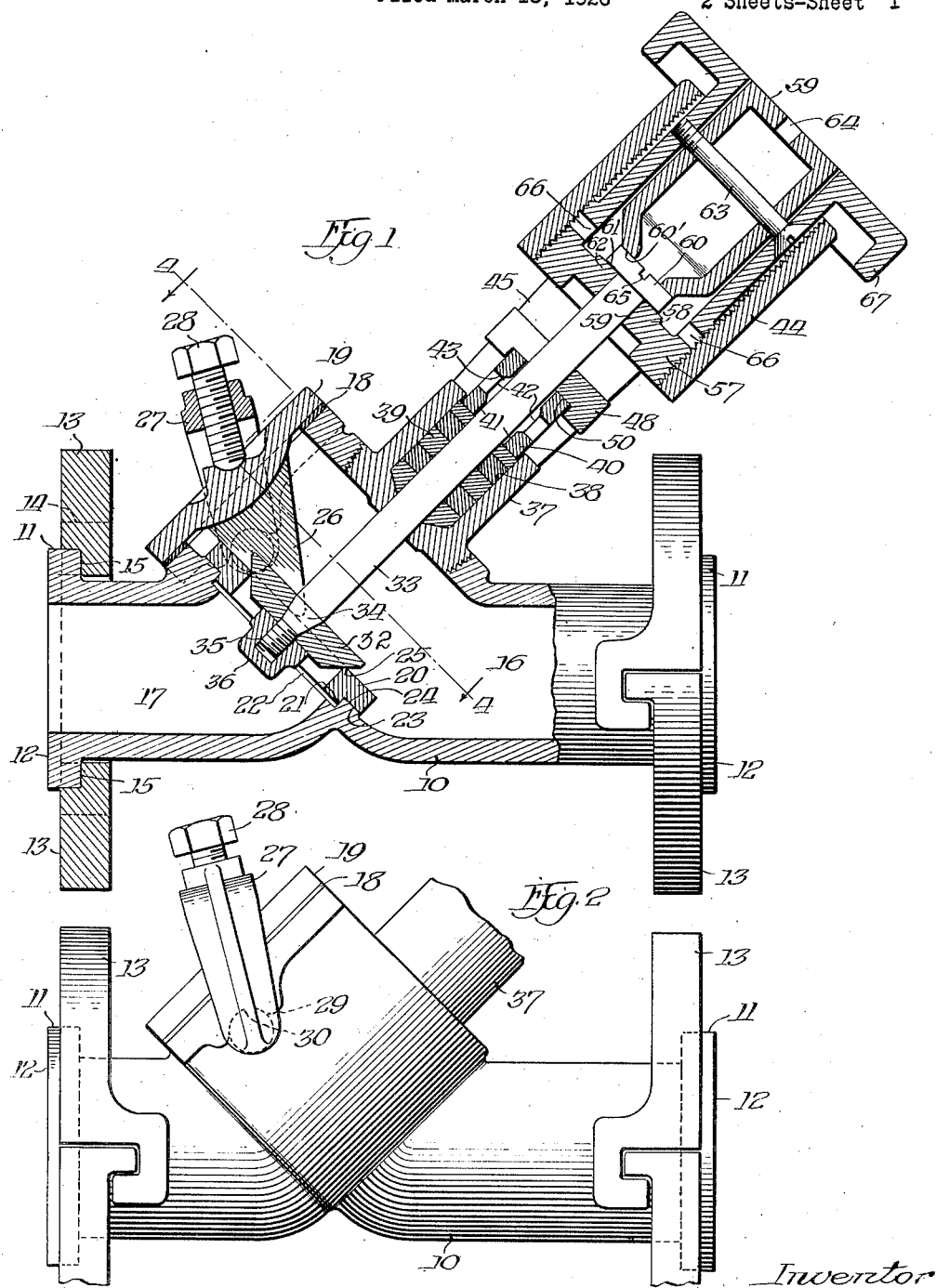

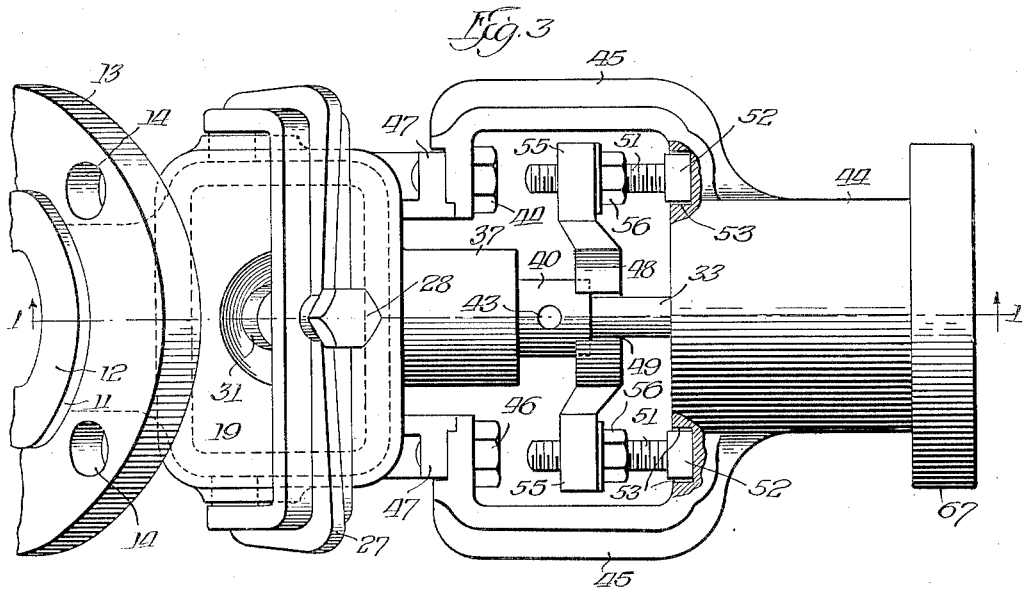
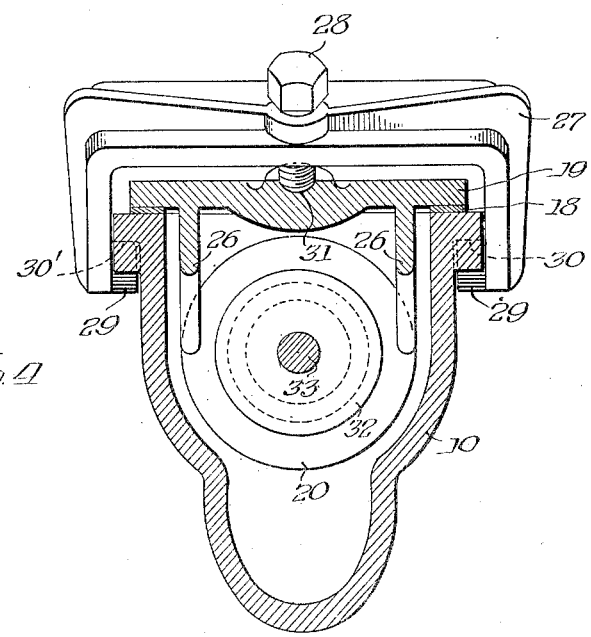

1,679,907

UNITED STATES PATENT OFFICE.

HARRY E. LA BOUR, OF HOMEWOOD, ILLINOIS.

VALVE.

Application filed March 18, 1926. Serial No. 95,519.

My invention relates to valves.

While the particular valve which I shall herein specifically disclose is adapted for handling corrosive fluids, I do not wish to limit the invention to that particular structure, since certain features of this invention may be used in valves applied to other fields of utility.

In valves of this type, i. e., valves used for corrosive fluids, it is frequently necessary to renew the plug member and the seat member for, although the parts are made of corrosion resisting metals, they are subject to wear and action by impurities in the fluids being handled. These parts in particular are the most vital because they must at all times be in good mechanical condition in order to make a tight joint.

According to my invention, I provide renewable plug and seat members and, in order to make the matter of renewing and repairing these parts as convenient as possible, I provide a lateral opening in the valve body adjacent the location of both these parts, so that by removing a cover plate I can reach in through the opening and have access to both the plug and the seat members for inspection, repair, or replacement. This construction permits such access to these parts without removing the valve from the line in which it is connected.

It is a difficult matter to fasten down the valve seat member so it will be tight on its seat on the valve body or casing. If screw threads are used, the body threads and the threads on the seat become fouled or corroded and it becomes difficult or impossible to thread the parts together or to loosen them. By my invention the seat member is held in place by an external screw member which, therefore, is not exposed to the action of the liquid being handled.

The preferred way in which I do this is to provide fingers on the inside of the cover member, which fingers extend into contact with the seat. Preferably, two fingers are employed, but this is optional.

My invention provides an external clamp which has the dual function of holding the cover tightly over the lateral opening and of pressing the fingers down upon the seat member. In the preferred embodiment the clamp presses against the cover member at an angle to the plane of the cover so as to provide a component of pressure in the direction for holding the cover over the opening, and another component of pressure in a direction for holding the seat member tightly in place. Within my invention the cover may be pivoted to the casing, and by swinging about this pivot provide the necessary pressures for holding the cover and for holding the seat member.

Another feature of my invention is the gland and follower construction. It is difficult to keep the gland of a valve of this type tight. As a result, the corrosive fluid tends to leak along the stem and corrode the gland follower and the yoke. While it would be possible to make these parts also of a non-corrodible material, the cost is a deterrent. According to this invention I provide a novel form of gland and a follower which backs against the yoke. It is constructed in such a manner that, while it may be readily adjustable, it is also a separate assembly which may be removed and replaced with little cost. The gland provides a drain opening for bleeding away any leakage of corrosive liquid in such a way as to keep such leakage away from the parts which are made of other than noncorrodible materials.

In the preferred form of my invention, the valve plug and its stem are moved to and from the seat without requiring rotation. My invention provides a novel form of hand wheel and operating mechanism which permits of ready assembly and disassembly without danger of binding the stem or coming loose therefrom, and which provides a lubricant container for lubricating the operating threads.

Now, in order to teach those skilled in the art how to construct and operate my invention, I shall describe in connection with the accompanying drawings a specific embodiment of the same.

In the accompanying drawings:—

Figure 1 is an elevation of the novel valve being mostly in section and as seen from the line 1—1 of Fig. 3, looking in the direction indicated by the arrows;

Fig. 2 is an elevation similar to Fig. 1 not in section in order to show the means of fastening the novel cap to the casing proper;

Fig. 3 is a plan of the valve mechanism as seen from a plane parallel to its axis; and Fig. 4 is a section through the apparatus on a plane perpendicular to the axis of the operating mechanism as indicated by the line 4—4 of Fig. 1 and seen looking in the direction indicated by the arrows.

Like numerals indicate identical parts throughout the several views.

The main casing or body of the valve 10 is composed of a comparatively strong non-corrodible alloy of which illium is an example. The casing 10 is terminated on both ends by flanges 11, the outer faces 12 of which are adapted to engage a gasket or the corresponding flanges on the ends of the pipe line to be connected by this valve. Split flanges 13 surround the casing and, by means of bolts drawn through the holes 14 and through co-operating holes in like flanges on the pipe line, are made to bear heavily upon the inside faces 15 of the flange 11, so as to form a leak proof joint. As clearly illustrated in Figures 1 and 2, the flange 13 is formed of two substantially semi-circular sections detachably secured together at their ends by means of rearwardly projecting lugs at the ends of one section fitting into forwardly directed members at the ends of the other section. It is apparent that none of the corrosive fluid can contact the flanges 13 so they may be made of ordinary material, such as malleable or cast iron.

As best seen in Fig. 1, the casing 10 includes two chambers 16 and 17, each of which has an end opening directly into the adjoining pipe line. The remaining end of the chamber 16 is slanted at an angle from the pipe line and is machined to co-operate with a gasket 18 and a novel cap or cover 19, which is also made of a material proof against corrosion. This cap and gasket effect a leak proof closure for this end of the chamber 16. The chamber 17 communicates with chamber 16 through a port and valve structure to be next described.

The valve seat proper is composed of a flanged ring 20, preferably made of illium or some such metal. The smaller part of the ring 20 is fitted into a bore 21 and abuts a gasket 22. The shoulder back of the flange 23 rests on a flat annular surface 24. It will be noted that the valve seat, not being threaded into place, is readily removable. It will also be noted that the flange 23 is above the opening which is normally closed by cover 19, as clearly illustrated in Figure 1. By removing the cover and inserting a suitable instrument under flange 23, valve 32 being raised, the valve seat member can be raised and removed with facility. The actual seat 25 on this member is of the taper type and very narrow so as to permit of a certain amount of cleaning action in order to preclude, as much as possible, the fouling of the valve.

The seat proper 20 is held in place in a novel manner. It will be noted that the cover 19 has depending therefrom a pair of arms 26. When the cover plate is in place, the arms 26 engage the outside face of flange 23 and thus hold the seat 20 in place against the gasket 22.

The novel cover 19 is held in place by a yoke 27 and a cap screw 28. The yoke 21 fits over the end of chamber 16 and has two lugs 29 which engage co-operating sockets 30 located on each side of the slanting portion of chamber 16. The cap screw 28 bears against the socket 31 in the cap 19 and, when tightened, clamps the cover tightly against the gasket 18 and, at the same time, the valve seat 20 against the gasket 22. It will be noted that the sockets or bearings 30 and 31 are so located as to cause the cap screw 28 to bear down on the cap 19 at such an angle as to have a component imparting pressure thereto to hold it in leak-proof contact with the end of the chamber 16. It will also be noted that the axes of the cap screw 28 and the arm 26 are substantially parallel and that the arms bear upon the valve seat 19 at such an angle as to have a component imparting sufficient pressure thereto to hold it in place against the gasket 22.

The valve plug 32 is made of non-corrodible material and is carried upon a stem 33 of the same material. The stem is equipped with a tapered portion 34, fitting into a correspondingly tapered hole in the plug. The threaded end portion 35 of the stem 33 is engaged by a non-corrodible cap nut 36 to hold the plug 32 in place. The tapered connection between the valve plug and the stem tends to hold the plug from rotating on the stem. A nut of this type is used in order that the fluid may not come in contact with the thread.

The stem 33 is housed in a guide member 37 which is made of illium or a similar non-corrodible material. The guide member 37 is threaded into the casing 10 so as to enter the slanting portion of chamber 16 and be axially in alignment with the valve seat 20. The member 37 is threaded into the housing 10 instead of being made integral therewith in order to provide a way for machining the casing 10 to receive the seat 20. Once in place, the housing 37 need not be removed and may be treated as integral with the casing 10.

The guide member 37 is bored out at 38 to house the usual gland packing 39. The gland 40 is of novel construction. It is made of non-corrodible material and it fits within the bore 38 to bear upon the packing 39. This gland has the usual bore 41 which fits about the stem, but also is enlarged centrally at 42. A plurality of holes 43 connect this enlargement with the outside.

Inasmuch as the rest of the parts of the valve are supported directly or indirectly by the stationary housing 44, it will be described next.

The hollow cylindrical housing 44 is rigidly supported upon arms or brackets 45, which in turn are fastened by cap screws 46 to lugs 47 extending from the housing 37.

The gland follower 48 is provided in order to force the gland against the packing in the customary manner. The follower 48 is provided with a slot 49 of sufficient width to permit it being slipped off and on the stem 33 laterally. A shallow counter bore 50 engages the end of the gland 40. Cap screws 51, the heads 52 of which are of non-circular configuration and engage corresponding sockets 53 also of such configuration and situated in the housing 44, pass through holes in the arms 55 which extend from the follower 48. Nuts 56 on the cap screws 51 afford means whereby the gland follower may be forced against the gland.

The cylindrical casing 44 is threaded internally to receive the hub of a hollow threaded operating member or hand wheel 57. The operating member 57 has a closed end 58 which is provided with a bore 59 to receive the operating stem 33. The stem is provided with a slotted head 60 which rides upon the machined face 61 of the slightly raised boss 62 on the bottom 58. The opposite end of the operating member 57 is closed by a hollow cylindrical plug 59' having a concave inner end terminating in a machined face 60' engaging the top face of the head of the operating stem. The plug 59' is retained within the operating member 57 by a transverse machine screw 63. It is intended that the plug be filled with cotton waste or a like absorbent material in order that the oil, which is introduced into the interior through a convenient opening 64, will be retained therein and fed through the screw driver slot 65, which is provided in the head 60 to lubricate the operating parts and seep through the holes 66 in the operating member 57 to lubricate the operating threads. It will be apparent that other means than the screw driver slot may be provided for permitting escape of lubricant from the hollow plug 59. The head 60 might be provided with polygonal sides to be engaged by a socket wrench, and oil holes or slots formed through it or through the plug 59. The flange 67 on the hand wheel is provided for easy grasp and, although not shown, may be fluted, knurled, or in some way roughened to provide a suitable grip.

The operation of the above-mentioned valve is as follows:—

Turning the operating member 57 in a counter clockwise direction will thread it upwards. The head 16 of the stem 33 will be pulled along and thus slide the stem through the gland to open the valve. The valve is closed by turning the operating member in the opposite direction, causing the plug 59 to bear against the top of the head 60 and force the stem downward through the gland and cause the plug 32 to contact the seat 19. The plug and stem are not required to rotate but no harm results from rotation during raising and lowering. It is not advisable in the normal operation of a valve of this general type to rotate the valve in contact with its seat because of the tendency to cut the same or to embed impurities. It will be noted that when the valve is in its wide open position it offers no more obstruction to the passage of solid material than that offered by the pipe line itself.

Should it be desired to "grind in" the plug and seat without removing the pressure from the line, all that is necessary is to screw the operating member out sufficiently to permit of the removal of the machine screw 63. The plug 59 can then be removed, and the operating member 45 thus turned down sufficiently to permit of the valve and seat coming in contact, after which a screw driver or other similar instrument may be inserted in the slot 65 to turn the stem and valve plug against the seat which, being very narrow, should soon become suitably fitted to the plug 59. The head 60 might be hexagonal or non-circular and engaged by a socket wrench for releasing the nut 36 at the lower end of the stem, as well as for grinding the valve plug 21 to seat. The reassembly of the operating member and its plug 59 is all that is necessary to place the apparatus in normal operating condition. The above operation of grinding can be performed without disturbing the gland or the packing.

The removal of the seat can be effected by opening the valve wide, draining the line, releasing the screw 28 and removing the yoke 27 and then by releasing the cap 19. The valve seat can then be taken out of its place and cleaned, repaired or replaced. The gasket 22 may also be replaced if worn or damaged.

It is apparent that the removal of the cap 19 opens the chamber 16 for inspection and cleaning.

If the valve plug 32 sticks on the tapered part of the stem, the hand wheel may be turned until the plug 32 is brought against the inside top of the valve body, whereupon the further operation of the hand wheel operates like a wheel puller to pull the stem out of the plug.

To replace the valve plug all that is necessary is to move the plug 59' to wide open position, as heretofore described, hold the nut 36 with a wrench and turn the stem 33 with a screw driver to remove the nut. Further retraction of the operating stem, as by turning the hand wheel, will pull the plug off of the tapered portion of the stem.

The gland may also be repacked by opening the valve to the extreme so that the top of the valve plug 32 bears against the inside top of the valve body. This stops or reduces leakage enough so that the gland may be repacked without draining the line.

Attention is directed to the fact that essential repairs or replacements can be effected without uncoupling the valve from the line, and that the special provision of oiling permits of infrequent attention without serious consequences.

The unique construction of this valve renders the parts which are not resistant to corrosion proof against unintentional contact with the corrosive fluid to a greater degree than prior constructions. The novel gland is one means for securing this desirable result. The enlarged bore 42 constitutes a small well for the collection of any small amount of corrosive fluid which may leak through the passage 39, while the lower hole 43 permits the fluid to drip down upon the casing 10, and the upper hole permits any gaseous fluids to escape without coming into contact with any of the corrodible parts.

Inasmuch as non-corrodible alloys or metals, such as illium, which possess sufficient strength to function as part of such valves without being reinforced by other metal are rare and consequently expensive, it is desirable to employ a minimum number of parts made up of this material. The present construction is the result in part of an effort to minimize the number of parts which must be non-corrodible. The only parts which must necessarily be made of illium or such metal are the main casing 10, the cap 19, the valve seat 20, the valve plug 32, the stem 33, the nut 36, and the gland 40. The gland follower may be also made of acid resisting material, but is so cheap and so easy of removal that it involves little expense to replace it, when corroded.

Taking into consideration the advantages of the features of the present invention, namely, the minimum amount of parts of expensive material, the provision for keeping the gland leakage away from the non-resistant parts, the easy assembly and disassembly for repairs, cleaning and replacement of parts, the simplicity and reliability of construction, the provision for oiling of the operating parts through long periods of inattention, and the inherent ruggedness of the unit as a whole, it is not intended that the use of the above structure be limited to the disclosure submitted except as defined by the scope and spirit of the appended claims.

While I refer to illium as the preferred alloy or metal for resisting corrosion, it is to be understood that I do not intend to be limited to this particular metal. The particular metal that may be employed depends upon the character of the fluid to be handled.

I claim:—

1. In a valve, a casing, valve mechanism including a removable valve seat disposed therein, an opening in said casing adjacent said valve mechanism, a cover for said opening including arm means on the under side of said cover for contacting with said valve seat to hold the same in place, and means for simultaneously clamping said cover and said valve seat in place.

2. In a valve, a casing, valve mechanism including a removable valve seat disposed therein, an opening in said casing adjacent said valve mechanism, a cover for said opening including means adapted to extend into said opening for engaging said valve seat to hold the same in place, clamping means exerting a force having a component in a direction perpendicular to the plane of said cover to hold the same in place, and a second component in a direction perpendicular to the plane of said valve seat to hold said seat in place.

3. In a valve mechanism, a valve stem, a gland disposed about said stem, and a gland follower having a slot of sufficient width to receive said valve stem, and an axial socket at the inner end of the slot for engaging said gland.

4. In a valve, a casing, a valve stem, a yoke fixed to said casing, a gland disposed about said stem, a follower on said stem, and including arms engaging screw members for forcing said follower away from said yoke to actuate said gland, said screw members having non-circular heads, and said yoke having non-circular sockets for said heads.

5. In a valve, a casing, a valve stem including a head, a yoke fixed to said casing and having a hollow threaded boss, a hollow operating member threaded into said boss and engaging said head to cause said stem to move axially when said operating member is actuated, and means disposed within the operating member for storing a lubricant for lubricating the operating parts.

6. In a valve, a valve body having a stuffing box, a yoke member secured to the body over said stuffing box, an operating stem projecting through the stuffing box, a gland follower on the stem, said gland follower comprising a cross piece having a slot wide enough to receive the stem, a recess in the shape of a counter bore around the inner end of the slot, a gland member mounted on the stem and seated in said recess, bolts projecting through the ends of the follower, said bolts having heads of non-circular configuration, said yoke member having sockets of similar non-circular configuration for receiving the heads of the bolts, and nuts threaded on the bolts for pressing against the ends of the follower.

7. In combination, a yoke member having a pair of sockets for receiving non-circular bolt heads, a pair of bolts having non-circular heads fitting in said sockets, a stem extending axially of said yoke, said bolts lying substantially parallel to said stem, a gland on said stem, and a follower comprising a cross piece transverse to the stem, said cross piece having at its opposite end holes for receiving the shanks of the bolts and nuts threaded on the shanks of the bolts for engaging the ends of the follower.

8. In a valve, a body having a stuffing box, a yoke fastened to the body, said yoke having a hollow threaded boss in line with said stuffing box, a hand wheel having a recessed hub externally threaded into said hollow boss, said recessed hub having an axial hole through its bottom wall, an operating stem passing through said axial hole and having a head disposed within said recess, and a plug for said recess bearing upon the top of the head.

9. In a valve operating member, a yoke having a hollow threaded boss, a hand wheel having a recessed hub externally threaded into said hollow boss, said recessed hub having an axial hole through its bottom wall, an operating stem passing through said axial hole and having a head disposed within said recess, and a plug secured in said recess and bearing upon the top of the head.

10. In a valve operating member, a yoke having a hollow threaded boss, a hand wheel having a recessed hub externally threaded into said hollow boss, said recessed hub having an axial hole through its bottom wall, an operating stem passing through said axial hole and having a head disposed within said recess, a plug secured in said recess and bearing upon the top of the head, and a transverse pin in said plug and in said hub for securing the parts together.

11. In combination, a hand wheel having a recessed hub member, the lower end of the hub member being threaded, a stem projecting through the bottom of the recessed hub member, said stem having a head lying within the recess, and a hollow plug secured in the recess and bearing against the top of the head.

12. In combination, a hand wheel having a hollow boss, said boss being externally threaded, said hub having a bottom wall with an opening therethrough, a stem projecting through the opening, said stem having a head at its upper end resting against the bottom wall of the hub, said hub having holes extending from the inside out to the threaded surface for distributing a lubricant, and means within said hollow hub against the head of the stem.

13. In combination, a hand wheel having a hollow hub extending axially thereof, said hub being threaded externally, said hub having a bottom wall, an axial hole therethrough, a stem lying in said hole and having a head bearing on its under side against the bottom wall, a hollow plug disposed within said hollow hub, said plug bearing against the head of the stem, and a pin for pinning the plug and hub together.

14. In a valve, a valve body having a stuffing box, a stem projecting through the stuffing box into the interior of the valve body, a valve plug mounted on the stem, a nut on the lower end of the stem for holding the valve body thereupon, a yoke having a hollow threaded barrel, in line with the stem, a hand wheel having a hollow hub threaded externally into said barrel, said hub having a bottom wall with a hole therethrough for receiving the stem, said stem having a head above said bottom wall, said head having a screw driver slot for holding the stem, and means inside the hollow hub and secured thereto for bearing against the top of said head.

15. In combination, a valve body, a stem projecting into the body, said stem having a tapered shoulder at its lower end, a valve plug having a tapered socket fitting on said tapered shoulder, a nut threaded on the stem beyond said valve plug to hold the tapered part together, a yoke secured to the body, said yoke having a hollow barrel axially in line with the stem, a hand wheel having a hollow hub externally threaded into said barrel, said hollow hub having a bottom wall with an opening therethrough, said stem projecting through the opening and having a head lying above said bottom wall, said hand wheel being operable on its threads to pull the stem upwardly by its head until the valve plug engages the inner wall of the valve body for pulling the tapered shoulder out of the tapered socket in the valve plug.

16. In combination, a casing having inlet and outlet passages and a valve chamber provided with an opening permitting access thereto from the exterior of the casing, means for normally closing said opening, a valve seat member fitting into the inner end of the outlet passage and disposed within the valve chamber, the seat member being otherwise free and having a peripheral flange at its inner end disposed above the bottom of the valve chamber opening, and a valve co-operating with the flanged end of said seat member.

In witness whereof, I hereunto subscribe my name this 16th day of March, 1926.

HARRY E. LA BOUR.